United States Patent
Chen et al.

(10) Patent No.: US 9,018,100 B2
(45) Date of Patent: Apr. 28, 2015

(54) DAMASCENE PROCESS USING PVD SPUTTER CARBON FILM AS CMP STOP LAYER FOR FORMING A MAGNETIC RECORDING HEAD

(75) Inventors: Yanfeng Chen, Milpitas, CA (US); Yunjun Tang, Pleasanton, CA (US); Yana Qian, Sunnyvale, CA (US); Ming M. Yang, San Jose, CA (US); Yunfei Li, Fremont, CA (US); Paul E. Anderson, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 399 days.

(21) Appl. No.: 12/943,835

(22) Filed: Nov. 10, 2010

(65) Prior Publication Data
US 2012/0111826 A1 May 10, 2012

(51) Int. Cl.
| | |
|---|---|
| H01L 21/302 | (2006.01) |
| H01L 21/461 | (2006.01) |
| H01L 21/311 | (2006.01) |
| B44C 1/22 | (2006.01) |
| B23P 15/00 | (2006.01) |
| C03C 25/00 | (2006.01) |
| G11B 5/31 | (2006.01) |

(52) U.S. Cl.
CPC ............ *G11B 5/3116* (2013.01); *G11B 5/3163* (2013.01)

(58) Field of Classification Search
None
See application file for complete search history.

(56) References Cited

U.S. PATENT DOCUMENTS

| | | | |
|---|---|---|---|
| 5,246,884 A | 9/1993 | Jaso et al. | |
| 6,316,329 B1 | 11/2001 | Hirota et al. | |
| 6,348,395 B1 | 2/2002 | Clevenger et al. | |
| 6,696,759 B2 | 2/2004 | Clevenger et al. | |
| 7,037,847 B2 | 5/2006 | Le et al. | |
| 7,160,477 B2 | 1/2007 | Bandic et al. | |
| 7,246,424 B2 | 7/2007 | Huang et al. | |
| 7,248,434 B2 | 7/2007 | Dill et al. | |
| 7,444,740 B1 | 11/2008 | Chung et al. | |
| 7,544,884 B2 * | 6/2009 | Hollars | 136/256 |
| 7,587,810 B2 | 9/2009 | Le | |
| 2006/0174474 A1 | 8/2006 | Le | |
| 2007/0177301 A1 * | 8/2007 | Han et al. | 360/126 |
| 2008/0166870 A1 * | 7/2008 | Huang et al. | 438/619 |
| 2008/0244896 A1 | 10/2008 | Bonhote et al. | |
| 2008/0297945 A1 * | 12/2008 | Han et al. | 360/125.3 |
| 2010/0062177 A1 | 3/2010 | Jiang et al. | |

OTHER PUBLICATIONS

Yeldose et al, Characterization of DC magnetron sputtered diamond-like carbon (DLC) nano coating, 2008, Int J Adv Manuf vol. 38, p. 705-717.*

(Continued)

*Primary Examiner* — Stephanie Duclair

(57) ABSTRACT

Damascene processes using physical vapor deposition (PVD) sputter carbon film as a chemical mechanical planarization (CMP) stop layer for forming a magnetic recording head are provided. In one embodiment, one such process includes providing an insulator, removing a portion of the insulator to form a trench within the insulator, depositing a carbon material on first portions of the insulator using a physical vapor deposition process, disposing at least one ferromagnetic material on second portions of the insulator to form a pole including a portion of the ferromagnetic material within the trench, and performing a chemical mechanical planarization on the at least one ferromagnetic material using at least a portion of the carbon material as a stop for the chemical mechanical planarization.

21 Claims, 6 Drawing Sheets

(56) References Cited

OTHER PUBLICATIONS

S. Ramachandran, L. Tao, T. H. Lee, S. Sant, L. J. Overzet, M. J. Goeckner, M. J. Kim, G. S. Lee, and W. Hua. Deposition and patterning of diamondlike carbon as antiwear nanoimprint templates. J. Vac. Sci. Technol. B, vol. 24, No. 6, Nov./Dec. 2006. pp. 2993-2997. American Vacuum Society.

X. Li, A. Highsmith, S. Gupta, A. Paranjpe, and K. Rook. A statistical approach to optimization of alumina etching in a high density plasma. J. Appl. Phys. 104, 033307 (Aug. 14, 2008). American Institute of Physics.

M. Jiang, S. Hao, R. Komanduri. On the advanced lapping process in the precision finishing of thin-film magnetic recording heads for rigid disc drives. Appl. Phys. A 77, 923-932 (Jan. 15, 2003). Springer-Verlag.

\* cited by examiner

DAMASCENE PROCESS USING PVD SPUTTER CARBON FILM AS CMP STOP LAYER FOR FORMING A MAGNETIC RECORDING HEAD

FIELD

The present invention relates to magnetic recording technology, and more specifically to a damascene process using physical vapor deposition (PVD) to sputter carbon film as a chemical mechanical planarization (CMP) stop layer for forming a magnetic recording head.

BACKGROUND

Conventional damascene processes for forming a magnetic recording head include a chemical mechanical planarization (CMP) step to planarize the surface of a magnetic pole and thereby accurately control a height of the magnetic pole for the magnetic recording head. In order to control and limit the chemical mechanical planarization process to particular depths, corresponding to the height of the magnetic pole, a CMP stop layer is typically used. Conventional damascene processes are described further in U.S. Pat. No. 7,444,740, the entire content of which is incorporated herein by reference.

In conventional processes, the CMP layer is a diamond like carbon (DLC) material that is deposited using chemical vapor deposition (CVD) or plasma enhanced chemical vapor deposition (PECVD). However, DLC deposited using CVD or PECVD can result in delamination problems for the deposited DLC layer. More specifically, the DLC deposited using PECVD has poor adhesion to many metals and in particular to atomic layer deposition alumina that is commonly used in magnetic recording head fabrication processes. The DLC deposited using PECVD also has very high stress. As a result of these problems with DLC deposited using PECVD, magnetic recording head manufacturing processes can experience substantial yield losses. As such, an improved damascene process is needed.

SUMMARY

Aspects of the invention relate to damascene processes using physical vapor deposition (PVD) to sputter carbon film as a chemical mechanical planarization (CMP) stop layer for forming a magnetic recording head. In one embodiment, the invention relates to a method for depositing carbon as a chemical mechanical planarization stop layer, the method including providing an insulator, removing a portion of the insulator to form a trench within the insulator, depositing a carbon material on first portions of the insulator using a physical vapor deposition process, disposing at least one ferromagnetic material on second portions of the insulator to form a pole including a portion of the ferromagnetic material within the trench, and performing a chemical mechanical planarization on the at least one ferromagnetic material using at least a portion of the carbon material as a stop for the chemical mechanical planarization.

DETAILED DESCRIPTION

Figure 1:
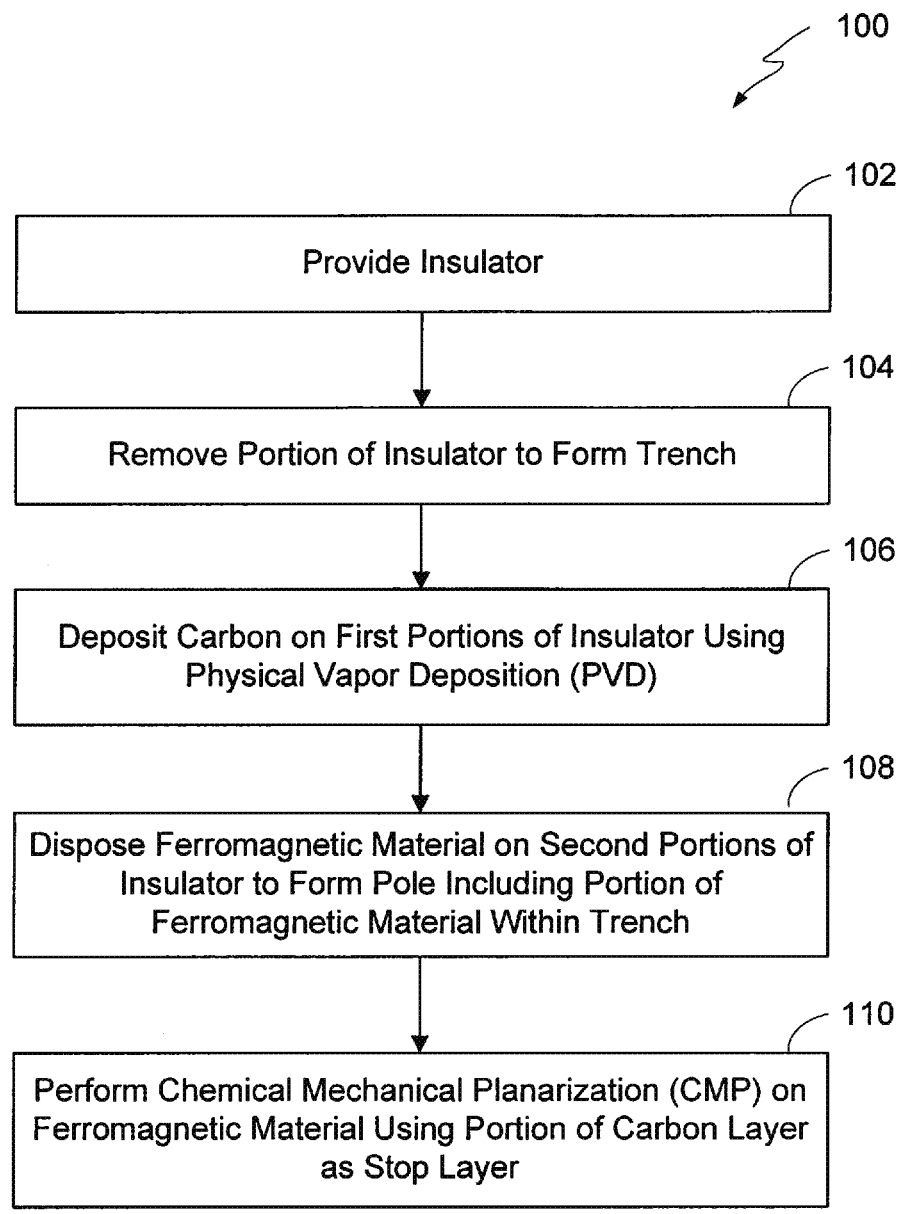
FIG. 1 is a flow chart of a process for forming a magnetic recording head where the process includes using physical vapor deposition to deposit carbon material for a chemical mechanical planarization stop layer in accordance with one embodiment of the invention.

Referring now to the drawings, embodiments of damascene processes for forming a magnetic recording head by depositing carbon material as a chemical mechanical planarization stop layer using physical vapor deposition are illustrated. The processes can form a trench within an insulator substrate, deposit carbon material on areas of the substrate using a physical vapor deposition process, dispose magnetic material on areas of the substrate to form a pole within the trench, and perform chemical mechanical planarization on the magnetic material using the carbon material as a stop layer. In some embodiments, the process can include additional steps resulting in additional layers. In some embodiments, for example, other metal layers are deposited and patterned using various photo resist layers that are also deposited and patterned.

The PVD carbon layer deposited using the PVD process can provide substantially improved performance. In particular, the PVD carbon can reduce delamination and can have lower stress and better CMP rates than DLC deposited using conventional processes. In addition, the PVD carbon can be manufactured using less expensive tooling than conventional processes. The PVD carbon also has better adhesion than CVD DLC. In particular, the adhesion of CVD DLC to a number of dielectrics and metal films is poor. In addition, the PVD carbon also has better CMP rates. In one embodiment, the CMP rate of PVD carbon is about one fifth that of CVD DLC.

While not bound by any particular theory, it is believed that the PVD carbon provides better performance due to a smaller percentage of hydrogen in the PVD carbon than is present in the CVD or PECVD DLC, which often includes use of hydrogen rich methane gas. For example, it is believed that conventional CVD DLC processes result in a material with about 30 percent of hydrogen, while the PVD carbon processes result in a material with less than 5 percent hydrogen. It is believed that the higher hydrogen content is responsible for the higher stress in CVD DLC.

Diamond like carbon films and PVD carbon materials are composed of carbon atoms of both SP2 hybridization and SP3 hybridization. The SP2 atoms are like the ones in soft graphite while the SP3 atoms are more like the ones in hard diamond. The PECVD methods with proper amount of hydrogen have been found to be able to increase the SP3 carbon content. As a result, the hardness, density, wear resistance, and other positive characteristics can be increased. Experimental data on PVD carbon or amorphous carbon material has shown that the hardness is indeed low which may not be desirable for some applications. However, the stress and CMP lapping rate of the PVD carbon are very good. The PVD carbon has good adhesion to a lot of metals and alumina, which are used in magnetic head fabrications. As a result, PVD carbon or amorphous carbon can be a better choice as the CMP stop layer for particular applications such as a damascene process for forming a magnetic recording head. In some instances, the PVD carbon can be referred to as diamond like carbon.

Throughout this detailed description reference is made to the term "on". It is intended that the term "on" be interpreted relatively broad. For example, in various portions of this application, a first layer may be said to be on a second layer or substrate. In this context, there may be one or more intervening layers between the first and second layers.

FIG. 1 is a flow chart of a process 100 for forming a magnetic recording head where the process includes using physical vapor deposition to deposit carbon material for a chemical mechanical planarization stop layer in accordance with one embodiment of the invention. The process first provides (102) an insulator. In several embodiments, the insulator forms a substrate and includes alumina. The process then removes (104) a portion of the insulator to form a trench. In several embodiments, the removal is performed using a reactive ion etching process after a hard mask layer is also deposited on the insulator substrate. In a number of embodiments, the RIE process is performed such that the sides of the trench are formed at preselected angles.

The process then deposits (106) carbon on first portions of the insulator using physical vapor deposition (PVD). In several embodiments, the PVD carbon will be used subsequently as a CMP stop layer. In several embodiments, a photo resist layer is deposited and patterned to cover the trench prior to the deposition of the PVD carbon layer. The process then disposes (108) ferromagnetic or magnetic material on second portions of the insulator to form a magnetic pole including a portion of the ferromagnetic material within the trench. In several embodiments, the ferromagnetic material includes cobalt, nickel and/or iron. In a number of embodiments, a mill buffer layer and a plating seed layer are deposited prior to disposing the ferromagnetic material.

The process then performs chemical mechanical planarization (110) on the ferromagnetic material using portions of the PVD carbon as a stop layer. In several embodiments, an ion mill etching process is performed prior to the CMP process to remove the magnetic material from areas beyond the trench. In some embodiments, the PVD carbon layer can subsequently be removed using a reactive ion etching process. In addition, subsequent process steps can be performed to finalize the magnetic recording head as are known in the art, and as are described, for example, in U.S. Pat. No. 7,444,740, the entire content of which is incorporated herein by reference.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 2A:
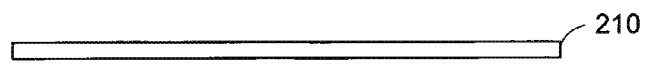
FIGS. 2a-2p are side views of a process for forming a magnetic recording head where the process includes using physical vapor deposition to deposit carbon material for a chemical mechanical planarization stop layer in accordance with one embodiment of the invention.
Figure 2B:
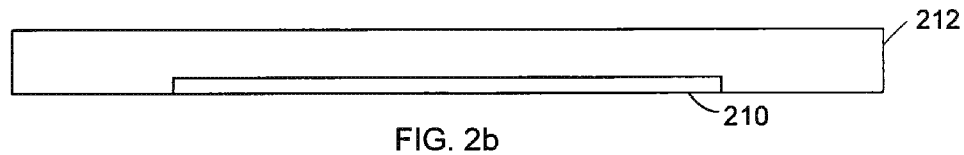
Figure 2C:
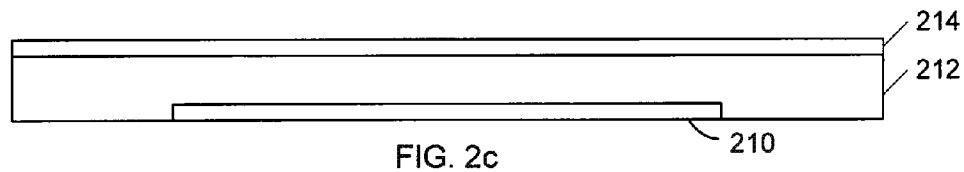
Figure 2D:
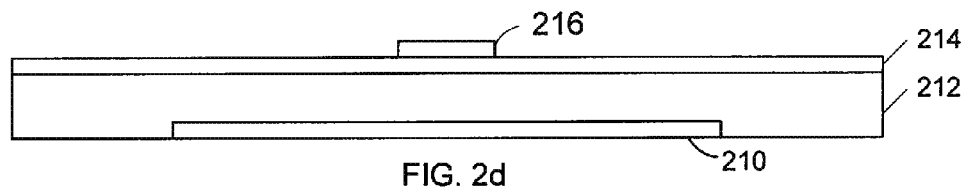
Figure 2E:
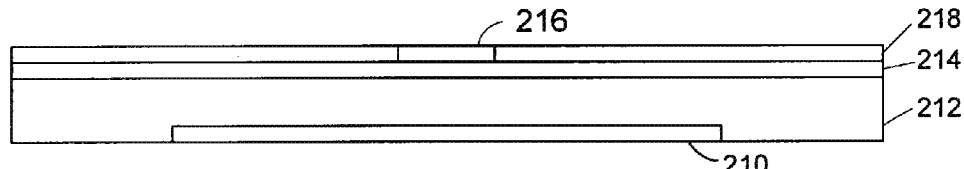
Figure 2F:
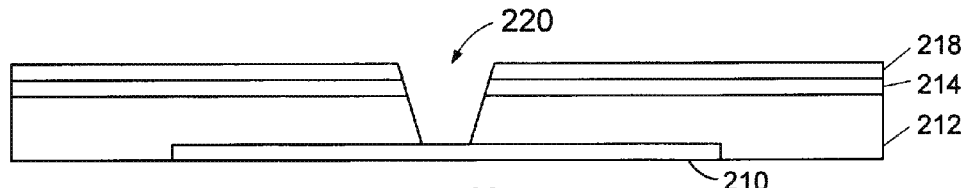
Figure 2G:
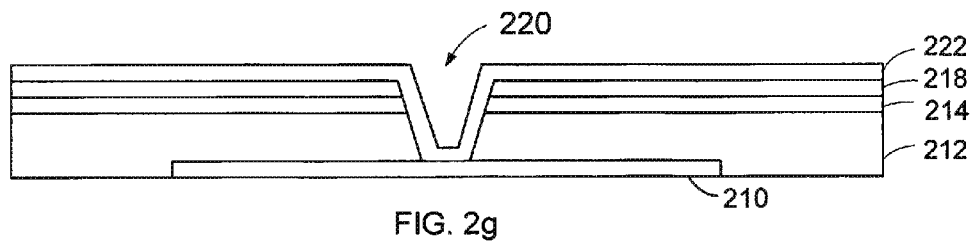
Figure 2H:
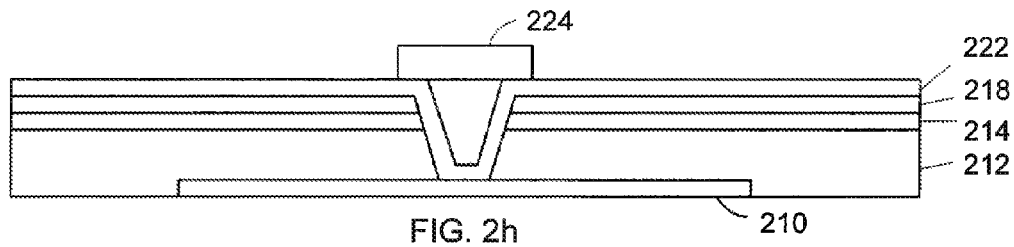
Figure 2I:
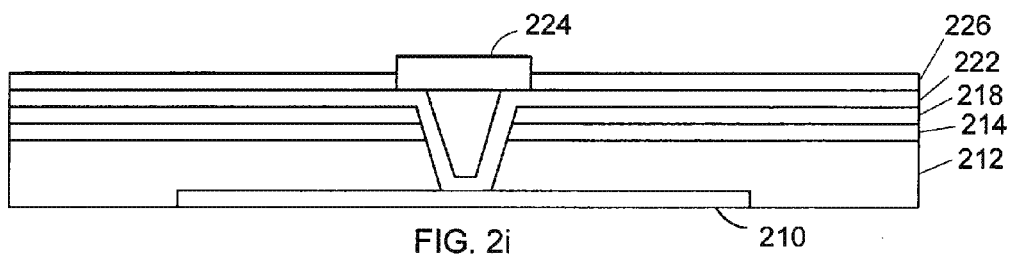
Figure 2J:
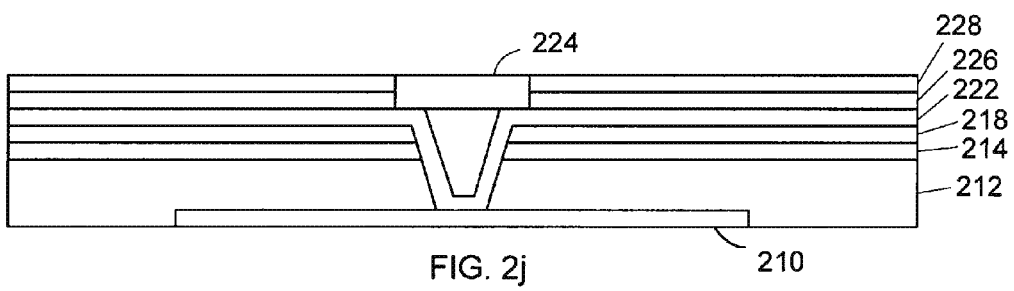
Figure 2K:
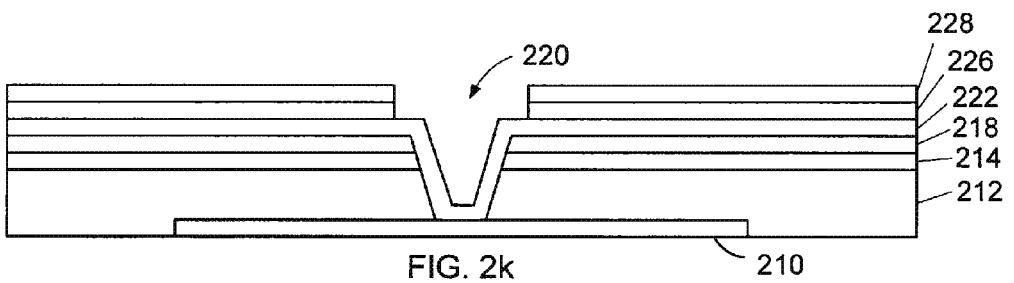
Figure 2L:
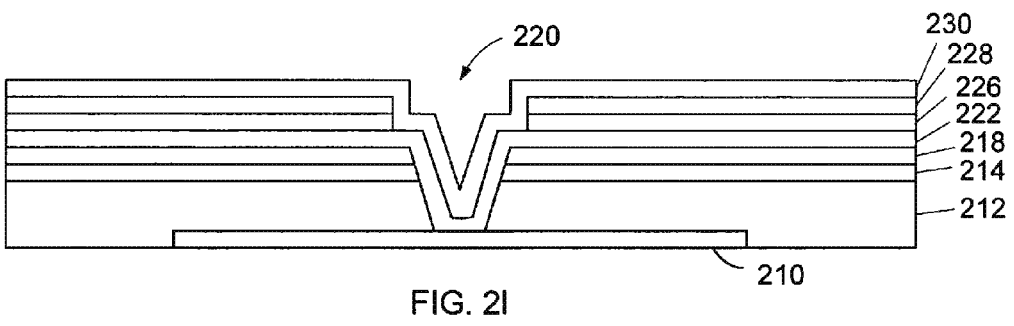
Figure 2M:
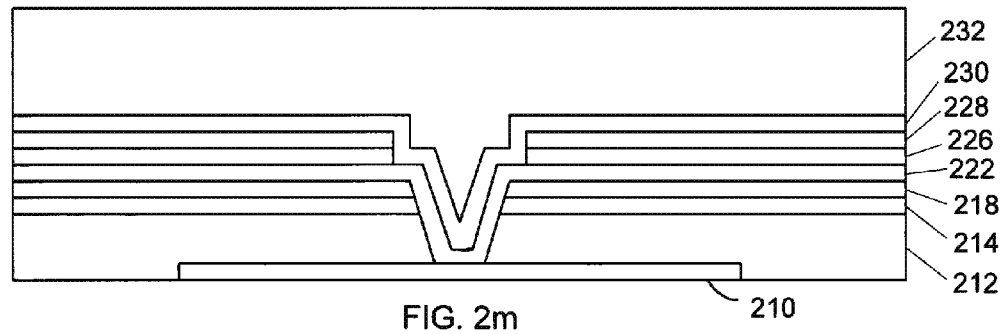
Figure 2N:
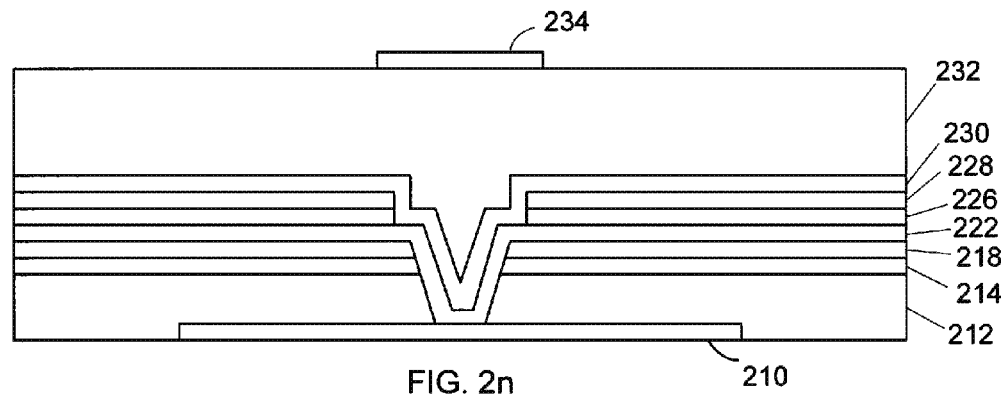
Figure 2O:
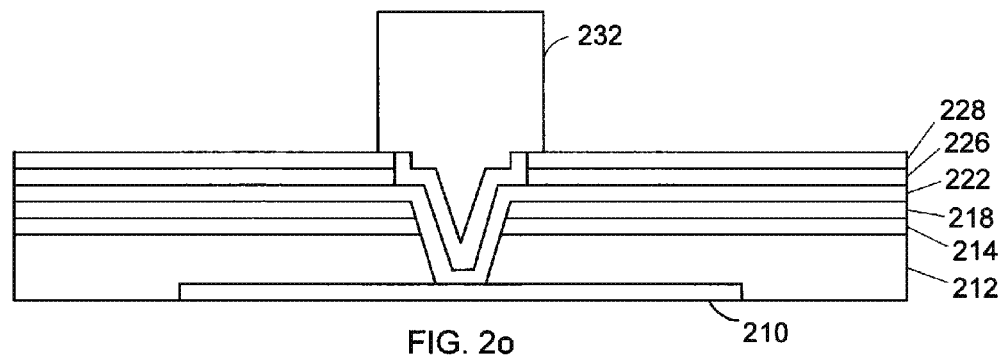
Figure 2P:
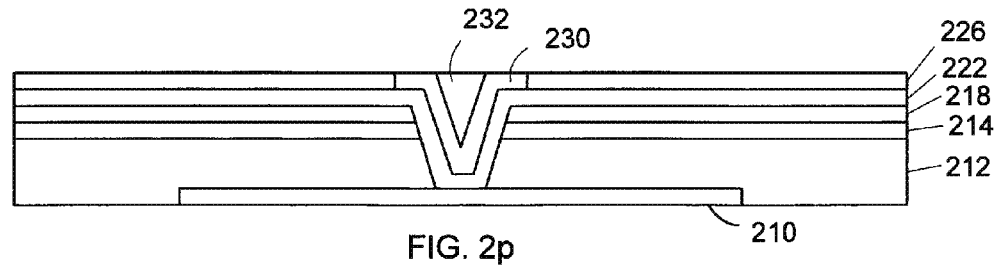

FIGS. 2a-2p are sequential side views of a process for forming a magnetic recording head including using physical vapor deposition to form a chemical mechanical planarization stop layer in accordance with one embodiment of the invention. Note that the layers and components of the magnetic recording head process are not drawn to scale.

FIG. 2a shows a side view of a base layer 210 of a magnetic recording head assembly, where the base layer is to be used subsequently as a reactive ion etching (RIE) stop layer in accordance with one embodiment of the invention. The base layer 210 is deposited and patterned to take the shape illustrated in FIG. 2a. The base layer 210 can be chromium or another suitable metal. In several embodiments, the chromium base layer is a reactive ion etching stop layer for subsequent etching of an alumina insulator substrate.

FIG. 2b shows a side view of the magnetic recording head assembly after a layer of alumina 212 has been deposited on the base layer 210 in accordance with one embodiment of the invention. In one embodiment, the alumina layer 212 is full film alumina. In some embodiments, the alumina layer 212 is deposited with a thickness of 2000 Angstroms (A) to 4000 A. In some embodiments, the alumina layer is referred to as an insulator or insulator layer.

FIG. 2c shows a side view of the magnetic recording head assembly after an adhesion layer 214 has been deposited on the alumina substrate layer 212 in accordance with one embodiment of the invention. The adhesion layer can be full film tantalum or another suitable material. In such case, the tantalum can have a similar reactive ion etching rate as does alumina which can be helpful during the reactive ion etching process to accurately form a trench for creating the magnetic pole. In addition, the adhesive tantalum can enhance adhesion between the alumina and other layers such as the hardmask.

FIG. 2d shows a side view of the magnetic recording head assembly after a photo resist layer 216 has been deposited and patterned on the adhesion layer 214 in accordance with one embodiment of the invention. The photo resist layer 216 is positioned near a center of the magnetic recording head assembly on the adhesion layer 214 in an area desired for the trench.

FIG. 2e shows a side view of the magnetic recording head assembly after a hard mask layer 218 is deposited on the photo resist layer 216 and the adhesion layer 214 and then removed from the sides of the photo resist layer 216 in accordance with one embodiment of the invention. In several embodiments, the hard mask layer 218 includes nickel, iron and/or chromium films. In other embodiments, the hard mask layer 218 includes other suitable materials. In some embodiments, the hard mask layer 218 is removed from sides of the photo resist using an ion milling process.

FIG. 2f shows a side view of the magnetic recording head assembly after the photo resist 216 has been removed and an alumina reactive ion etching process has been performed to form a trench 220 in accordance with one embodiment of the invention. In several embodiments, the alumina reactive ion etching process is performed such that the trench sidewalls are formed at preselected angles. As shown in FIG. 2f, the trench 220 has a cross section with a substantially trapezoidal shape.

FIG. 2g shows a side view of the magnetic recording head assembly after a thin control layer 222 is deposited using an atomic layer deposition process, where the thin layer 222 (e.g., made of alumina) is used to control the trench width of the magnetic pole in accordance with one embodiment of the invention. The thin control layer is deposited on the hard mask layer 218 and within the trench 220.

FIG. 2h shows a side view of the magnetic recording head assembly after a second photo resist layer 224 is deposited and patterned on the thin ALD layer 222 to cover the trench 220 in accordance with one embodiment of the invention.

FIG. 2i shows a side view of the magnetic recording head assembly after a carbon layer 226 is deposited using physical vapor deposition, where the PVD carbon layer 226 can be a CMP stop layer in accordance with one embodiment of the invention. In several embodiments, the PVD carbon material is deposited with a thickness of about 300 A to 800 A. The PVD carbon can be deposited using a cluster tool with a graphite (carbon) target.

In one embodiment, the target is about 12 inches in diameter. The chamber pressure for the PVD can be about 6 mTorr with an argon gas flow of about 80 standard cubic centimeters per minute (sccm). A target power of about 0.5 kilowatts (kW)

to 2 kW can be applied depending on the deposition rate desired. A rotary magnetron can be positioned on the backside of the target to get good uniformity for the PVD carbon layer. In several embodiments, the uniformity of the PVD carbon layer can be important to manufacturing efficiencies such as yield. Other factors for obtaining good uniformity include proper control of gas flow, gas pressure, target and substrate distance, backside magnetron formation, and/or other similar factors. In some embodiments without a rotary magnetron, it may be that a larger diameter target is needed.

FIG. 2*j* shows a side view of the magnetic recording head assembly after a mill buffer layer 228 is deposited on the PVD carbon layer 226 in accordance with one embodiment of the invention. In several embodiments, the mill buffer layer includes alumina and is deposited with a thickness of a couple thousand angstroms.

FIG. 2*k* shows a side view of the magnetic recording head assembly after the second photo resist layer 24 is removed in accordance with one embodiment of the invention. As a result of the removal, the PVD carbon layer 226 and the mill buffer layer 228 remain along areas beyond the trench 220.

FIG. 2*l* shows a side view of the magnetic recording head assembly after a plating seed layer 230 is deposited on the mill buffer layer 228 and within the trench 220 in accordance with one embodiment of the invention. In several embodiments, the plating seed layer 230 is deposited or disposed using a plating process. In several embodiments, the plating seed layer 230 includes tantalum and/or ruthenium.

FIG. 2*m* shows a side view of the magnetic recording head assembly after a layer of magnetic materials 232 has been full film plated on top of the plating seed layer 230 in accordance with one embodiment of the invention. In several embodiments, the magnetic materials 232 include cobalt, nickel, and/or iron. In other embodiments, the magnetic materials 232 can include, or be replaced by, other suitable materials. In another embodiment, the layer of magnetic materials 232 is deposited directly without having deposited the plating seed layer.

FIG. 2*n* shows a side view of the magnetic recording head assembly after a third photo resist layer 234 has been deposited and patterned on the magnetic material layer 232 to substantially cover the trench area in accordance with one embodiment of the invention.

FIG. 2*o* shows a side view of the magnetic recording head assembly after an ion mill etch has removed portions of the magnetic material layer 232 beyond the trench and the plating seed layer 230, and the third photo resist layer 234 has been removed in accordance with one embodiment of the invention.

FIG. 2*p* shows a side view of the magnetic recording head assembly after the magnetic material layer 32 has been planarized using a chemical mechanical planarization (CMP) process and the PVD carbon layer 226 as the CMP stop layer in accordance with one embodiment of the invention. In a number of embodiments, a thin layer of alumina (e.g., about 0.6 to 1 micrometers thick) is deposited prior to the CMP process. After the CMP process, the PVD carbon layer can be removed by a reactive ion etching process. In addition, subsequent process steps can be performed to finalize the magnetic recording head as are known in the art, and as are described, for example, in U.S. Pat. No. 7,444,740, the entire content of which is incorporated herein by reference.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 3A:
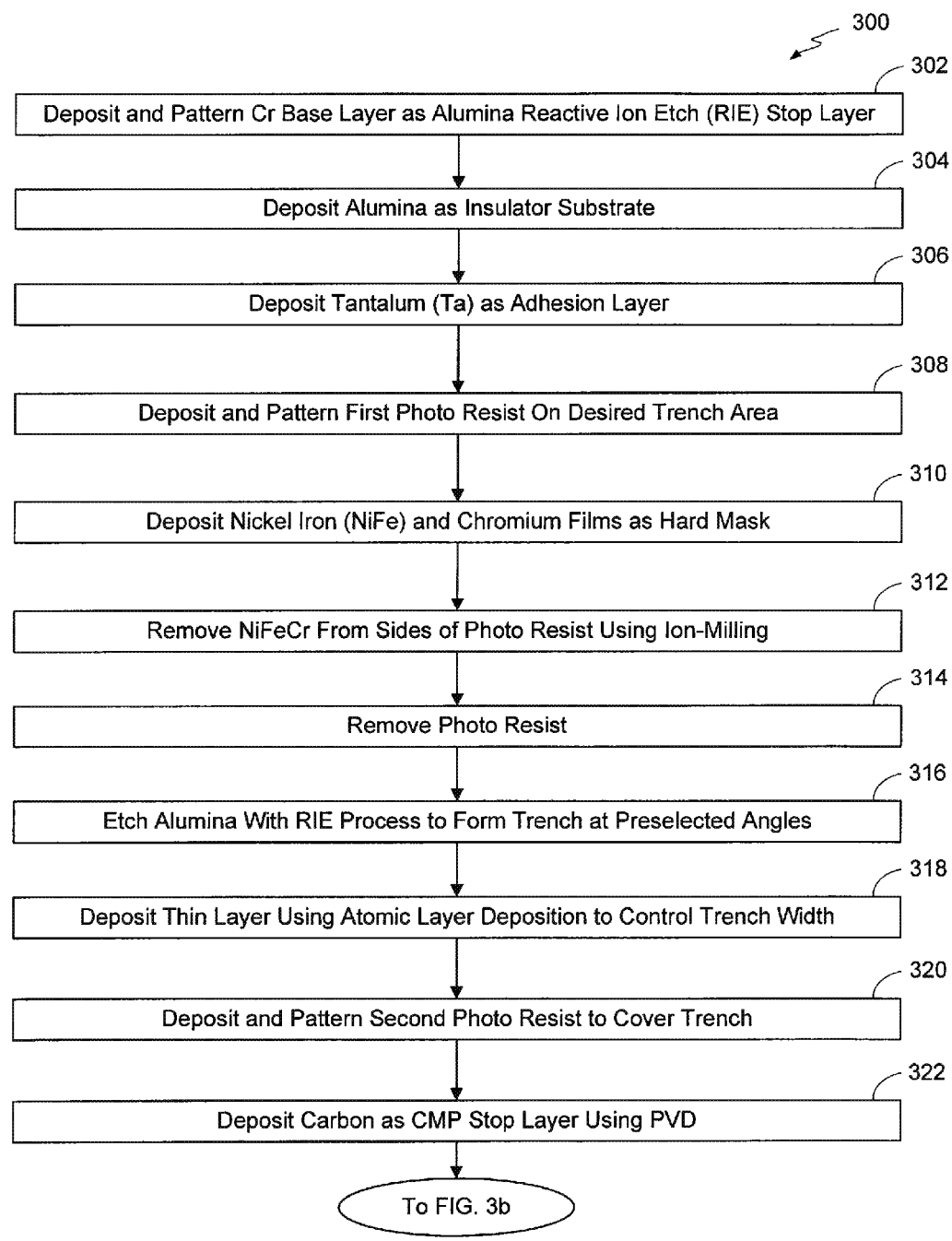
FIGS. 3a-3b illustrate a flow chart of a another process for forming a magnetic recording head where the process includes using physical vapor deposition to deposit carbon material for a chemical mechanical planarization stop layer in accordance with one embodiment of the invention.
Figure 3B:
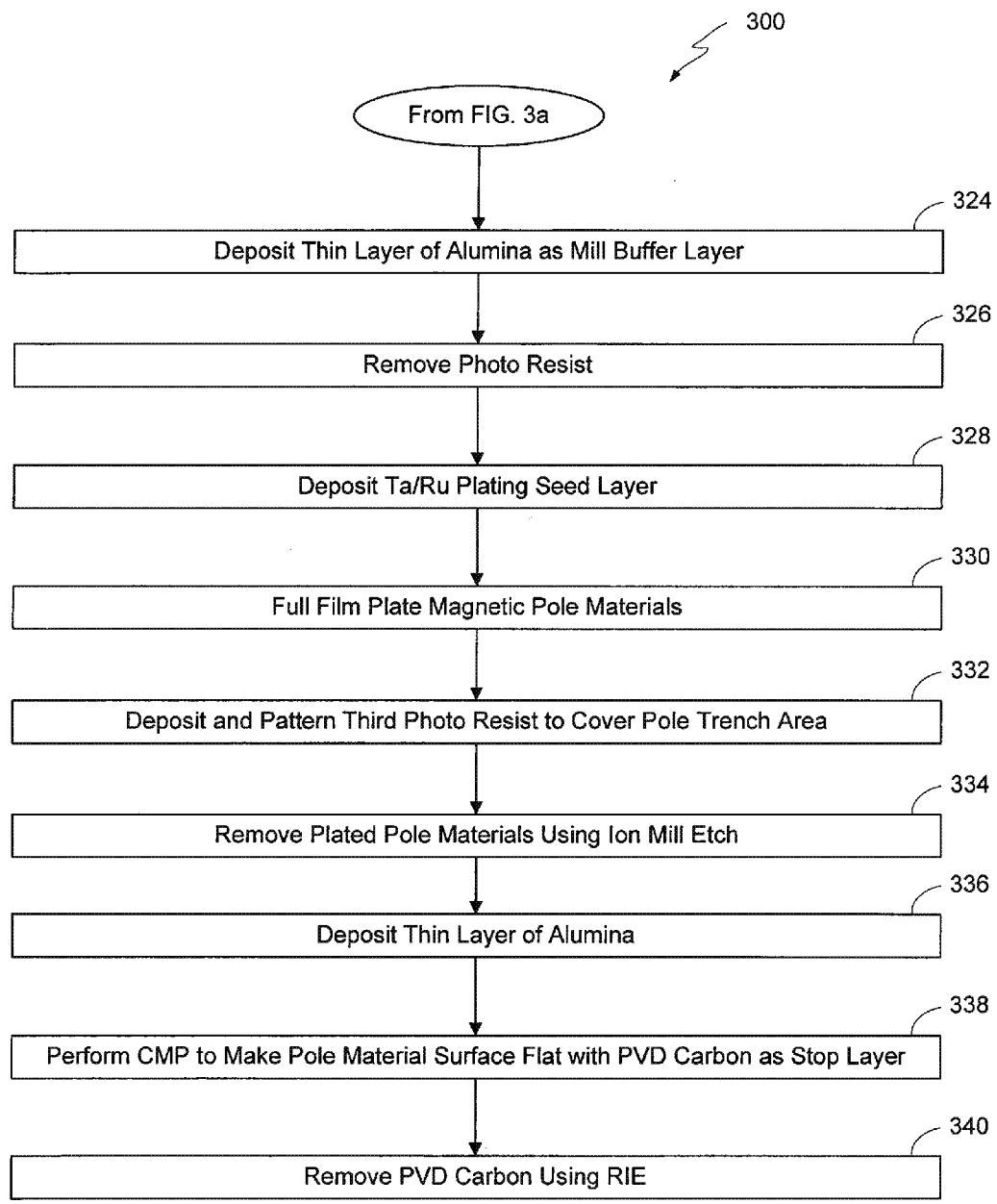

FIGS. 3*a*-3*b* illustrate a flow chart of a another process 300 for forming a magnetic recording head where the process includes using physical vapor deposition to deposit carbon for a chemical mechanical planarization stop layer in accordance with one embodiment of the invention. In particular embodiments, the process 300 can correspond to, and/or be used in conjunction with, the processes described above for FIGS. 1 and 2. The process first deposits and patterns (302) a chromium base layer to act as an alumina reactive ion etch (RIE) stop layer. In some embodiments, the chromium base layer can be formed of another suitable material and/or combined with other suitable materials. The process deposits (304) alumina as an insulator substrate on the base layer. In other embodiments, the insulator can be formed of another suitable material and/or combined with other suitable materials. In one embodiment, the alumina is deposited as full film alumina. In some embodiments, the alumina is deposited with a thickness of 2000 A to 4000 A. In some embodiments, the alumina layer is referred to as an insulator and/or insulator layer.

The process then deposits (306) tantalum as an adhesion layer. In other embodiments, the adhesion layer can be formed of another suitable material and/or combined with other suitable materials. In one embodiment, tantalum can have a similar reactive ion etching rate as does alumina which can be helpful during a subsequent reactive ion etching process. The process then deposits and patterns (308) photo resist on an area desired for a trench. The process then deposits (310) nickel, iron and chromium films to form a hard mask layer. The process then removes (312) the NiFeCr from the sides of the photo resist using an ion milling process. The process removes (314) the photo resist. The process then etches (316) the alumina with a reactive ion etching (RIE) process to form the trench walls at a preselected angles. The process then deposits (318) a thin layer using atomic layer deposition to control the trench width. The thin layer can include alumina or other suitable materials.

The process then deposits and patterns (320) a second photo resist layer to substantially cover the trench. The process then deposits (322) carbon as a CMP stop layer using physical vapor deposition (PVD). In several embodiments, the PVD carbon material is deposited with a thickness of about 300 A to 800 A. The PVD carbon can be deposited using a cluster tool with a graphite (carbon) target. In one embodiment, the target is about 12 inches in diameter. The chamber pressure for the PVD can be about 6 mTorr with an argon gas flow of about 80 standard cubic centimeters per minute (sccm). A target power of about 0.5 kW to 2 kW can be applied depending on the deposition rate desired. A rotary magnetron can be positioned on the backside of the target to get good uniformity for the PVD carbon layer. In several embodiments, the uniformity of the PVD carbon layer can be important to manufacturing efficiencies such as yield. Other factors for obtaining good uniformity include proper control of gas flow, gas pressure, target and substrate distance, backside magnetron formation, and/or other similar factors.

Referring now to FIG. 3*b*, the process deposits (324) a thin layer of alumina to act as a mill buffer layer. In several embodiments, the mill buffer layer is deposited with a thickness of a couple thousand angstroms. The process then removes (326) the second photo resist layer. The process deposits (328) a plating seed layer including tantalum and ruthenium. In several embodiments, the plating seed layer can include other suitable materials. In a number of embodiments, the plating seed layer is deposited using a plating process. The process then performs full film plating (330) of magnetic materials for a magnetic pole. In several embodiments, the magnetic materials or ferromagnetic materials include cobalt, nickel, and/or iron. A portion of the magnetic materials are disposed within the trench.

The process then deposits and patterns (332) a third photo resist layer to substantially cover the pole trench area. The process then removes (334) the plated pole magnetic material from areas beyond the trench using an ion mill etching process. The process deposits (336) a thin layer of alumina. This thin layer of alumina can help ensure that the top surface of the work piece is relatively flat and uniform prior to planarization. In a number of embodiments, the thin layer of alumina is about 0.6 to 1 micrometers thick. The process then performs chemical mechanical planarization (338) to make the pole magnetic material substantially flat with the PVD carbon layer acting as a stop layer. The process then removes (340) the PVD carbon layer using a reactive ion etching process.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

Processes using PVD to deposit carbon for a chemical mechanical planarization stop layer have been described for use in forming a magnetic recording head. In other embodiments, the processes using PVD to deposit carbon for a chemical mechanical planarization stop layer described herein can be used in conjunction with other applications. For example, in one embodiment, the PVD carbon process can be used to provide a hardmask layer in a process for manufacturing a reader or writer for a magnetic storage device. In another embodiment, the PVD carbon process can be used to provide an adhesion layer. For example, in one such case, the PVD carbon process provides a thin adhesion layer and a photo resist layer is then placed on the adhesion layer. In such case, the thin PVD carbon adhesion layer provides for increased accuracy in the shape of the photo resist layer.

What is claimed is:

1. A method for depositing carbon as a chemical mechanical planarization stop layer, the method comprising:
    providing a first insulator;
    removing a portion of the first insulator to form a trench within the first insulator;
    depositing, using atomic layer deposition, a second insulator continuously along the trench and on portions of the first insulator beyond the trench;
    depositing a first patterned photo resist layer covering the trench;
    depositing a carbon material directly on first portions of the second insulator and the first photo resist layer using a physical vapor deposition process;
    removing the first photo resist layer;
    disposing at least one ferromagnetic material on second portions of the second insulator to form a pole comprising a portion of the ferromagnetic material within the trench; and
    performing a chemical mechanical planarization on the at least one ferromagnetic material using at least a portion of the carbon material as a stop for the chemical mechanical planarization.

2. The method of claim 1, further comprising removing substantially all of the carbon material using a reactive ion etching process.

3. The method of claim 2, wherein the providing the first insulator comprises:
    providing the first insulator; and
    depositing an adhesive layer on the first insulator.

4. The method of claim 3, wherein the depositing the adhesive layer on the first insulator comprises:
    depositing the adhesive layer on the first insulator; and
    depositing at least one hard mask on portions of the adhesive layer, the at least one hard mask having an aperture therein, wherein the trench is formed under the aperture.

5. The method of claim 4, wherein the depositing at least one hard mask on the adhesive layer comprises:
    depositing a first patterned photo resist layer;
    depositing the at least one hard mask on the adhesive layer and the first patterned photo resist layer;
    removing the hard mask from a top surface of the first photo resist layer; and
    removing the first photo resist layer.

6. The method of claim 4, wherein the depositing the at least one hard mask on the portions of the adhesive layer comprises:
    depositing the at least one hard mask on the portions of the adhesive layer; and
    depositing the second insulator on the at least one hard mask and the trench.

7. The method of claim 6, wherein the depositing the carbon material directly on the first portions of the second insulator and the first photo resist layer using the physical vapor deposition process comprises:
    depositing the carbon material directly on the first portions of the second insulator and the first photo resist layer using the physical vapor deposition process; and
    depositing a buffer layer on the carbon material layer.

8. The method of claim 7, wherein the depositing the carbon material directly on the first portions of the second insulator and the first photo resist layer using the physical vapor deposition process comprises:
    depositing a first patterned photo resist layer;
    depositing the carbon material directly on the first portions of the second insulator and the first photo resist layer using the physical vapor deposition process;
    depositing a buffer layer on the carbon material layer; and
    removing the buffer layer, the carbon material layer and the photo resist layer.

9. The method of claim 7, wherein the depositing the buffer layer on the carbon material layer comprises:
    depositing the buffer layer on the carbon material layer; and
    depositing a plating seed layer on the buffer layer and on second portions of the second insulator.

10. The method of claim 9, wherein the providing the first insulator comprises depositing the first insulator on a reactive ion etching stop layer.

11. The method of claim 10:
    wherein the first insulator comprises alumina, and
    wherein the at least one ferromagnetic material comprises at least one of nickel, iron and cobalt.

12. The method of claim 11:
wherein the adhesive layer comprises tantalum,
wherein the at least one hard mask comprises at least one of nickel and iron,
wherein the buffer layer comprises alumina,
wherein the plating seed layer comprises at least one of tantalum and ruthenium, and
wherein the reactive ion etching stop layer comprises chromium, nickel and iron.

13. The method of claim 1, wherein the depositing the carbon material directly on the first portions of the second insulator using the physical vapor deposition process comprises:
depositing the carbon material directly on the first portions of the second insulator using the physical vapor deposition process comprises providing a rotary magnetron positioned proximate a target configured to emit the carbon material.

14. The method of claim 13, wherein the target is positioned between the rotary magnetron and the second insulator.

15. The method of claim 13, wherein the rotary magnetron is configured to provide a substantial uniformity of the carbon material on the portions of the second insulator.

16. The method of claim 1, wherein a stress of the carbon material deposited using the physical vapor deposition process is lower than a stress of carbon material deposited using a chemical vapor deposition process.

17. The method of claim 1, wherein a rate of chemical mechanical planarization for the carbon material deposited using the physical vapor deposition process is lower than a rate of chemical mechanical planarization for carbon material deposited using a chemical vapor deposition process.

18. The method of claim 1, wherein the disposing the at least one ferromagnetic material on the second portions of the second insulator to form the pole comprising the portion of the ferromagnetic material within the trench comprises plating the at least one ferromagnetic material on the second portions of the second insulator to form the pole comprising the portion of the ferromagnetic material within the trench.

19. The method of claim 1, wherein the first insulator and the second insulator each comprise alumina.

20. The method of claim 1, wherein a cross section of the trench comprises a substantially trapezoidal shape.

21. The method of claim 1, wherein the carbon material remains on areas beyond the trench.

* * * * *